United States Patent
Mo et al.

(10) Patent No.: US 12,002,249 B1
(45) Date of Patent: Jun. 4, 2024

(54) DEEP LEARNING-BASED OVERLAY KEY CENTERING SYSTEM AND METHOD THEREOF

(71) Applicant: AUROS TECHNOLOGY, INC., Hwaseong-si (KR)

(72) Inventors: Soo-Yeon Mo, Hwaseong-si (KR); Ga-Min Kim, Hwaseong-si (KR); Hyo-Sik Ham, Hwaseong-si (KR)

(73) Assignee: AUROS TECHNOLOGY, INC., Hwaseong-si (KR)

( * ) Notice: Subject to any disclaimer, the term of this patent is extended or adjusted under 35 U.S.C. 154(b) by 0 days.

(21) Appl. No.: 18/142,903

(22) Filed: May 3, 2023

(30) Foreign Application Priority Data

Nov. 14, 2022 (KR) .......................... 10-2022-0151232

(51) Int. Cl.
| | |
|---|---|
| *G06V 10/24* | (2022.01) |
| *G06V 10/25* | (2022.01) |
| *G06V 10/60* | (2022.01) |
| *H04N 5/265* | (2006.01) |

(52) U.S. Cl.
CPC .............. *G06V 10/24* (2022.01); *G06V 10/25* (2022.01); *G06V 10/60* (2022.01); *H04N 5/265* (2013.01)

(58) Field of Classification Search
CPC ......... G06V 10/24; G06V 10/25; G06V 10/60
See application file for complete search history.

(56) References Cited

U.S. PATENT DOCUMENTS

| | | | |
|---|---|---|---|
| 2004/0057627 A1 | 3/2004 | Abe et al. | |
| 2018/0107126 A1* | 4/2018 | Zhang ................ | G03F 7/70633 |

FOREIGN PATENT DOCUMENTS

| | | |
|---|---|---|
| JP | 2021-026019 A | 2/2021 |
| JP | 2022-039990 A | 3/2022 |
| JP | 2022-149848 A | 10/2022 |
| KR | 10-0394585 B1 | 8/2003 |
| KR | 10-2006-0085293 A | 7/2006 |
| KR | 10-0904732 B1 | 6/2009 |

(Continued)

OTHER PUBLICATIONS

Korean Office Action for related KR Application No. 10-2022-0151232 dated Mar. 23, 2023 from Korean Intellectual Property Office.

(Continued)

*Primary Examiner* — Sam Bhattacharya

(74) *Attorney, Agent, or Firm* — Paratus Law Group, PLLC

(57) ABSTRACT

There is provided a deep learning-based overlay key centering system and a method thereof that may precisely measure and examine an alignment state of fine patterns of a semiconductor substrate. The method includes collecting an input data set from at least one device, the input data set comprising measurement image data of an overlay key and label data including information on a position and bounding box size of the overlay; and training the model by inputting the input data set to a model for deep learning. The step of training the model may include a step of calculating a loss function by comparing result data predicted by the model with the label data; and a step of optimizing an algorithm of the model by modifying a weight of the model so that a loss value calculated with the loss function may become smaller than a reference value.

17 Claims, 5 Drawing Sheets

(56) References Cited

FOREIGN PATENT DOCUMENTS

| | | |
|---|---|---|
| KR | 10-2012-0048904 A | 5/2012 |
| KR | 10-1604789 B1 | 3/2016 |
| KR | 10-2021-0033907 A | 3/2021 |
| KR | 10-2022-0036803 A | 3/2022 |
| KR | 10-2022-0038707 A | 3/2022 |

OTHER PUBLICATIONS

Korean Notice of Allowance for related KR Application No. 10-2022-0151232 dated Jul. 19, 2023 from Korean Intellectual Property Office.
Japanese Office Action for related JP Application No. 2023-075830 mailed Jan. 23, 2024 from Japan Patent Office.

* cited by examiner

DEEP LEARNING-BASED OVERLAY KEY CENTERING SYSTEM AND METHOD THEREOF

CROSS-REFERENCE TO RELATED APPLICATION

This application claims priority to Korean Patent Application No. 10-2022-0151232 (filed on Nov. 14, 2022), which is hereby incorporated by reference in its entirety.

BACKGROUND

The present disclosure relates to a semiconductor process, more particularly, a system for centering a deep learning-based overlay key and a method thereof.

In a semiconductor process, a photo resist is coated on a surface of a wafer and light is transferred to the photoresist on the surface of the wafer deposited on a reticle in an exposure process using a stepper, to develop the photo resist after the exposure process. Hence, a circuit pattern is formed on the surface of the wafer in a photolithography process for etching the developed photo resist on the surface of the wafer, using an etching mask. A multilayer film having the circuit pattern is formed on the wafer surface by repeating the photolithography process, thereby manufacturing a semiconductor device.

In the exposure process of the semiconductor process that is performed to form a fine pattern on a semiconductor substrate, a photoresist is coated on a semiconductor substrate. While applying heat to the semiconductor substrate having the photoresist coated thereon, a pattern formed on a mask is matched to a pattern on a surface of the semiconductor substrate. After that, the photoresist of a predetermined area is exposed by partially transmitting light. After the exposure process, a developing solution is sprayed to remove the light-transmitted area or the light-not-transmitted area by using chemical action during the exposure. Then, a pattern is formed on the semiconductor substrate and an alignment state is measured to measure a degree of vertical alignment.

On the other hand, the degree of vertical alignment of an upper thin film layer and a lower thin film layer is called overlay to make a semiconductor chip on the wafer. An optical overlay measurement device inspect the alignment state of a pattern formed on a semiconductor substrate and a pattern formed in the current process, using an overlay key to detect a minute detect and a defect in a semiconductor process.

The overlay process performed to measure and inspect the alignment state of fine patterns of the semiconductor substrate may use an overlay mark to check whether the upper thin layer pattern and the lower thin layer pattern formed on the multilayer thin layer configured of multi-layers on the semiconductor substrate are aligned precisely, that is, to check the alignment state of the upper thin layer and the lower thin layer.

The optical overlay measurement device is an ultra-high precision measurement in the semiconductor process that uses the overlay mask to check whether the lower thin film layer pattern and the upper thin film layer pattern and the upper thin film layer pattern formed on the thin film multi-layers are accurately aligned on the multilayered semiconductor substrate and how well the circuit pattern is aligned by using the overlay mark.

To measure the degree of the alignment of the overlay mark, a PR (Pattern Recognition) action has to be preceded. When moving a stage to the position of the overlay key input in a recipe, there is a limit to fining the exact location due to the repeatability of the hardware (e.g., a robot, a state, etc.).

The PR action is a technology that corrects that. The matching position between a model image registered in the recipe and a live image on a FOV (Field of View) is detected as a center to additionally move a state as much as offset.

However, the method of performing the additional stage move by 1:1 matching between images may be possible when the image registered in the recipe can represent the images of all targets across the wafer.

A PR fail might occur when variations between the overlay key images are severe due to the effect of the process.

Accordingly, a technique for finding center coordinates of an overlay key and accurately centering the overlay key by correcting and supplementing the PR fail is required.

PRIOR ART

Cited Patent Document

Korean Registered Patent No. KR 10-1604789 (Mar. 13, 2016)

SUMMARY

Accordingly, one objective of the present disclosure is invented to solve the above-noted disadvantages of the prior art, and to provide a deep learning-based overlay key centering system to overcome variations between overlay key images due to process effects and perform PR (Pattern Recognition), and a method thereof.

Objects of the present invention are not limited to the above-described objects, and other objects and advantages of the present invention will be understood by the following description and will be more definitely understood through the embodiments of the present invention. It is also to be easily understood that the objectives and advantages of the present invention may be realized and attained by means and a combination thereof described in the appended claims.

A deep learning-based overlay key centering system according to an embodiment may include a server configured to collect an input data set, comprising measurement image data of an overlay key and label data including information on a location and bounding box size of the overlay key, from at least one overlay measurement device and input the input data set to a model for deep learning to train the model, The server may calculate a loss function by comparing result data predicted by the model with the label data, and optimizes an algorithm of the model by modifying a weight of the model so that a loss value calculated with the loss function may become smaller than a reference value, to train the model.

A method of centering a deep learning-based overlay according to an embodiment may include a step of collecting an input data set from at least one device, the input data set comprising measurement image data of an overlay key and label data including information on a position and bounding box size of the overlay; and a step of training the model by inputting the input data set to a model for deep learning.

The step of training the model may include a step of calculating a loss function by comparing result data predicted by the model with the label data; and a step of optimizing an algorithm of the model by modifying a weight of the model so that a loss value calculated with the loss function may become smaller than a reference value.

A deep learning-based overlay centering system according to an embodiment may include at least one overlay measurement device configured to generate an input data set, comprising measurement image data of an overlay key and label data, and transmit the input data set to a server. The label data may include information on a location and bounding box size of the overlay key.

The present disclosure may precisely center the overlay key based on deep learning, thereby precisely measuring and examining the alignment state of the fine patterns of the semiconductor substrate.

In addition, the present disclosure may prevent PR (Pattern Recognition) failure that might occur when variation for each overlay key is severe.

In addition, the present disclosure may compensate for PR misleading that might occur on a layer sensitively reacting to a PR parameter.

In addition to the above-described effects, specific effects of the present invention will be described together with the following detailed description for implementing the present invention.

DETAILED DESCRIPTION

Figure 1:
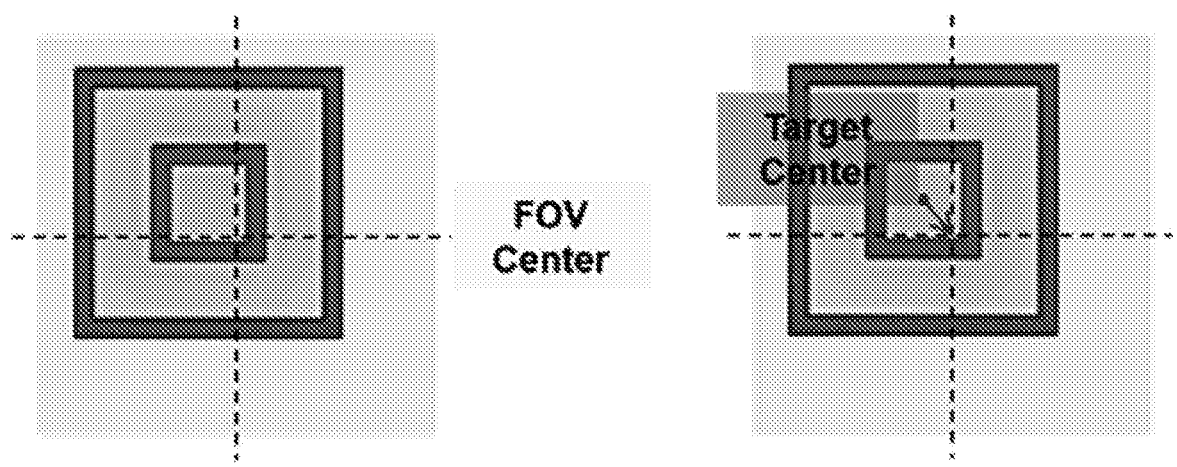
FIG. 1 is a view to describe a PR (Pattern Recognition) action.

The above objects, features and advantages will be described later in detail with reference to the accompanying drawings, and accordingly, those skilled in the art to which the present invention belongs will be able to easily implement the technical idea of the present invention. In describing the present invention, if it is determined that the detailed description of the known technology related to the present invention may unnecessarily obscure the subject matter of the present invention, the detailed description will be omitted. Hereinafter, preferred embodiments according to the present invention will be described in detail with reference to the accompanying drawings. In the drawings, the same reference numerals are used to indicate the same or similar components.

Hereinafter, a deep learning-based overlay key centering system to overcome variations between overlay key images that occur due to effects of process and perform PR (Pattern Recognition), and a method thereof.

Over the description, the overlay may be defined as a degree of vertical alignment of an upper thin film layer and a lower thin film layer in order to make a semiconductor chip on a wafer.

Over the description below, an overlay key may be defined as being used to detect minute defects and defects in a semiconductor process by examining an alignment state of a patter formed on a semiconductor substrate and a pattern formed on a current process through an optical overlay measurement device.

In the description, PRU may be defined as centering an overlay key within FOV (Field of View).

FIG. 1 is a view to describe a PR (Pattern Recognition) action.

When moving a stage to an overlay key position, there is a limit to finding the exact location due to repeatability of hardware (e.g., a robot, a stage, etc.).

A PR action is a technique for correcting the location, which additionally moves the stage as much as offset by detecting a location where a model image registered in a recipe and a live image on the FOV match as the center.

However, the method of performing the additional stage move by 1:1 matching between images may be possible when the image registered in the recipe can represent the images of all targets across the wafer.

A PR fail might occur when variations between the overlay key images are severe due to the effect of the process.

To solve such disadvantages, this embodiment uses an object detection technique to find the location and type of an object within an image. Features of an object to be detected are extracted in advance and trained to create a deep learning model. The corresponding features are detected within a given image and a center position of the overlay key is detected using the deep learning model.

To make a semiconductor chip on a wafer, a degree of vertical alignment of an upper thin film layer and a lower thin film layer may be called the overlay. An optical overlay measurement device may be configured to detect fine defects and semiconductor process detects by using an overlay key in examining an alignment state of a pattern formed on a semiconductor substrate and a pattern formed in a current process.

Figure 2:
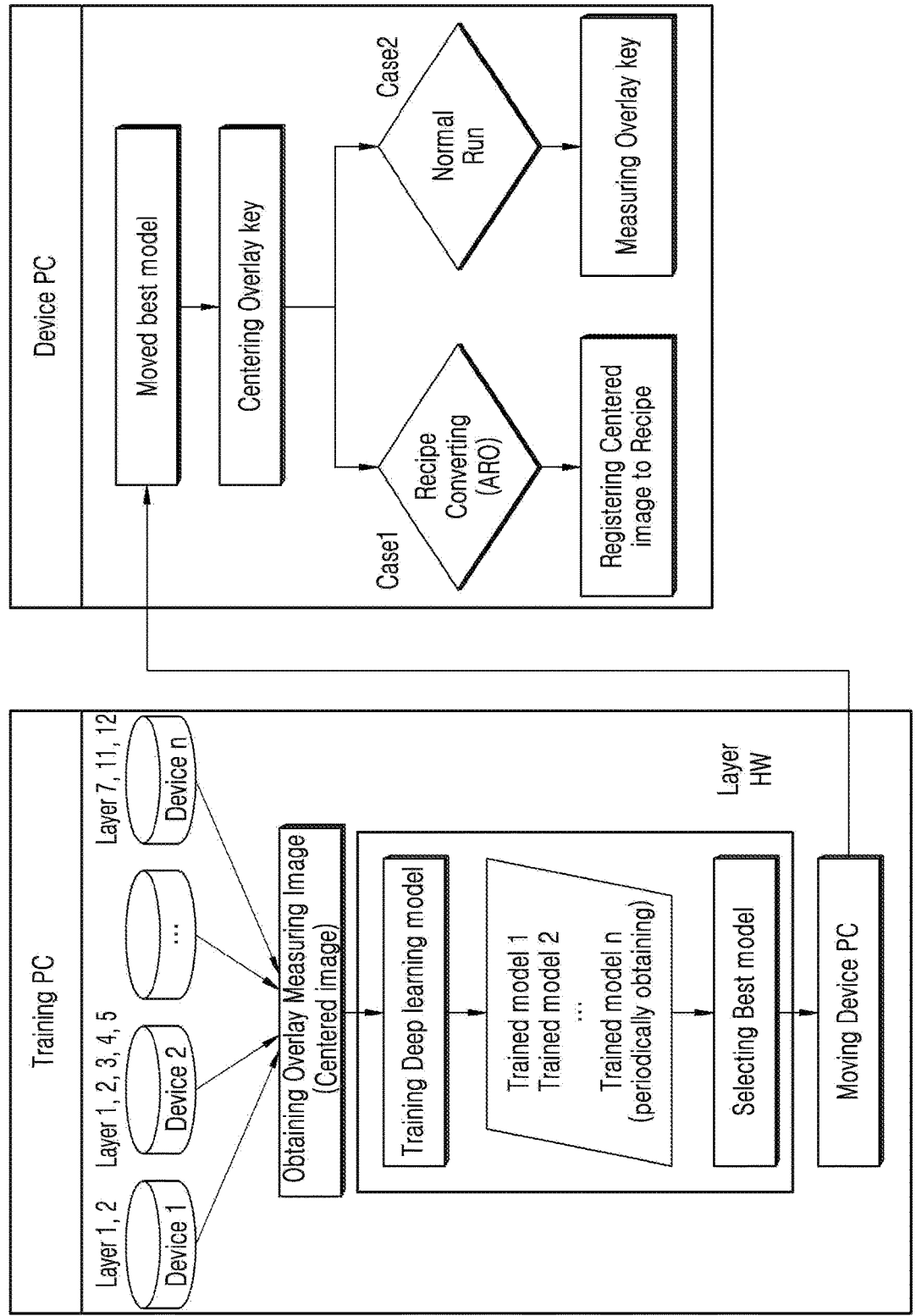
FIG. 2 is a flow chart of a deep learning-based overlay key centering system and a method thereof according to an embodiment.
Figure 3:
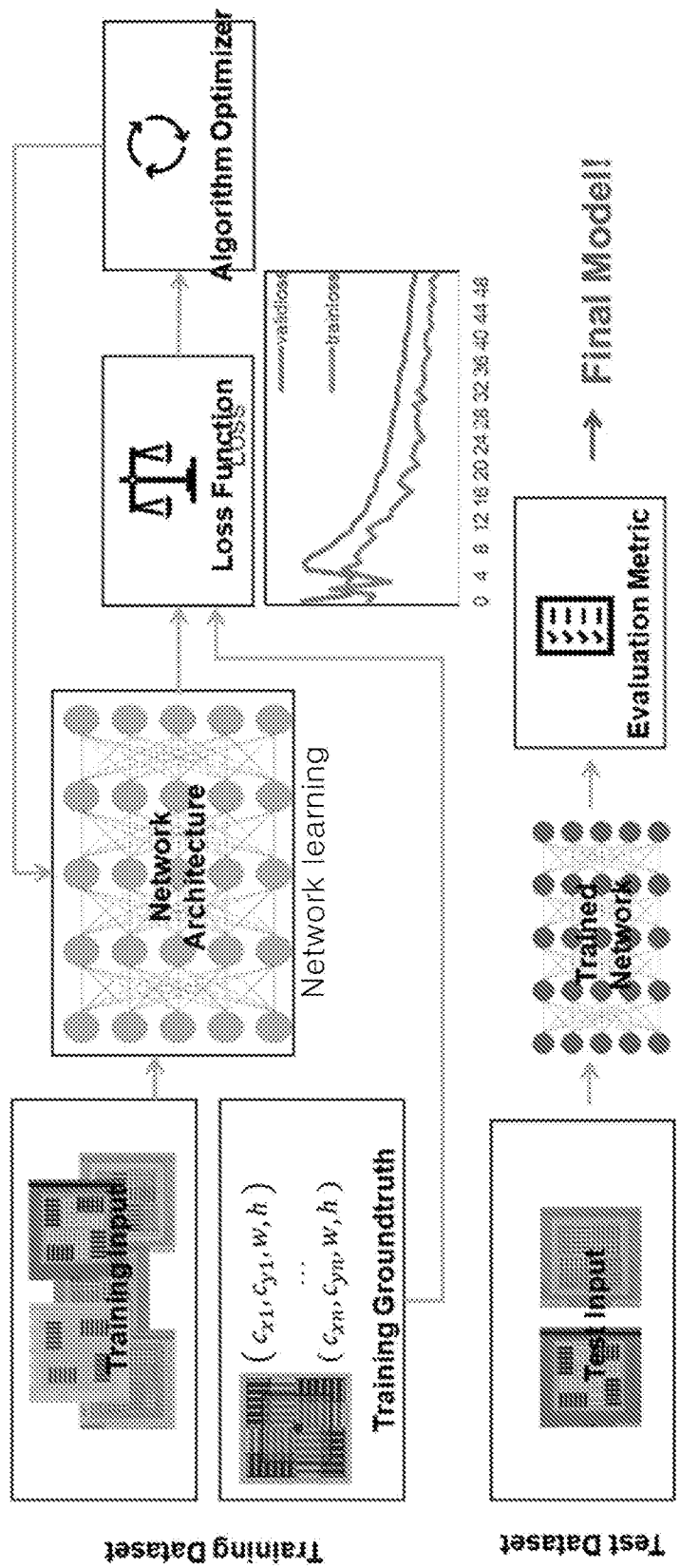
FIG. 3 is a block view showing a revolution neural network for deep learning of FIG. 2.

FIG. 2 is a flow chart of a deep learning-based overlay key centering system and a method thereof according to an embodiment. FIG. 3 is a block view showing a revolution neural network for deep learning of FIG. 2.

Referring to FIGS. 2 and 3, the deep learning-based overlay key centering system according to the embodiment may include an optical overlay measurement device, a training PC and an device PC.

The optical overlay measurement device may be configured to store and transmit input data sets to the training PC. Here, the input data sets may include measurement image data of the overlay key and label data including information on the location of the overlay key and the bounding box size.

As one example, the optical overlay measurement device may precisely find the center point of an overlay mark image at a target position by using a feature of symmetry between 0° images and 180° rotated images of optical overlay targets.

The training PC may collect input data sets from at least one optical overlay measurement device and input the collected input data sets to a model for deep learning in order to train the model. Here, the training PC may be a server connected to at least one or more optical overlay measurement devices through a network.

The training PC may calculate a loss function by comparing result data predicted by the model with label data. The training PC may by optimize the algorithm of the model by modifying the weight of the model and train the model so that a loss value calculated based on the loss function can be smaller than a reference value.

The training PC may repeat a process of modifying the weight of the model by inputting the input data sets to the model a preset number of times.

The training PC may select the best model among the trained models. Here, the training PC may select one model having a loss value that is smaller than the reference value. Among the selected models, a score may be calculated based on at least one of precision, recall, mAP (Mean Average Precision) and metric of F1, and a model with a high score may be selected as the best model.

The device PC may receive the best model from the training PC and center the overlay key based on the received best model. As one example, the device PC may receive a live image of the overlay key and detect a center coordinate value from the live image of the overlay key through the best model, to center the overlay key based on the center coordinate value.

When converting a recipe, the device PC may register the centered overlay key image in the recipe and detect a position at which a model image registered in the recipe and the live image on FOV match as the center to additionally move a state as far as offset.

On the other hand, the training PC may generate at least one measurement image data for training by processing measurement image data of the overlay key. As one example, measurement image data for training may be generated by rotating the measurement image data based on a predetermined angle. Images based on the position, angle, image brightness and wavelength of a target may be generated as measurement image data for training. As another example, images in which at least one of the position, angle, image brightness and wavelength of the measurement image data is changed may be generated as the measurement image data for the training.

A method of centering a deep learning-based overlay key may include a step of generating and storing measurement image data in at least one device, a step of collecting input data sets from the at least one device, a step of inputting the input data sets to a model for deep learning to train the model, a step of selecting the best model among the trained models, and a step of centering the overlay key by using the best model.

The at least one device may store the input data sets. As one example, the overlay measurement device may measure image data and label data of the overlay key. The input data sets may include measurement image data of the overlay key and label data including information on the position of the overlay key and the bounding box size.

As one example, the image data may be an overlay key measurement image file and the label data may be a text file including the information on the position of the overlay key and the bounding box size.

The stored input data sets may be collected in a server PC (i.e., the training PC) through FTP Migration.

The step of training the model may include a step of calculating a loss function by comparing the result data predicted by the model, and a step of optimizing an algorithm of the model by modifying the weights of the model to make a loss value calculated based on the loss function smaller than a reference value. The step of training the model may repeat a process of modifying the weights of the model by inputting the input data sets to the model a predetermined number of times.

As one example, the input data set may be input to a YOLO model (i.e., Network Architecture), and the loss function may be calculated by comparing the result value predicted by the YOLO model with the label value.

Hence, the algorithm may be optimized. As one example, the weight of the YOLO model is modified so that the loss value calculated based on the loss function becomes smaller. The above process may be repeated for a set number of epochs. For example, the epoch value may default to 100.

The step of selecting the best model may include a step of selecting a small model having a loss value smaller than a reference value, and a step of calculating a score based on at least one of precision, recall, mean average precision (mAP) and F1 metric among the selected models and selecting a model having a high score as the best model.

The items used to calculate the score and select the best model will be described in detail as follows.

Before describing the precision, recall, mAP, metric of F1, True Positive, False Positive, False Negative, and True Negative may be defined as follows, based on the result of the model and an actual correct answer value.

True Positive: Model result=True, Actual correct value=True (IOU>=Threshold).

False Positive: Model result=False, Actual correct value=False (IOU<Threshold)

False Negative: Model result=False, Actual correct value=True

True Negative: Model result=False, Actual correct value=False

<Precision>

Precision=True Positive/(True Positive+False Positive) =True Positive/all detections: Precision is a concept mainly used with Recall. Precision is an index that can indicate how accurate the predicted result is. Precision means the ratio of objects with correct answers among all detected objects.

<Recall>

Recall=True Positive/(True Positive+False Negative) =True Positive/(all ground truths)

<F1>

Harmonic mean of Precision and Recall, F1=2* (Precision*Recall)/(Precision+Recall)

Precision-Recall curve: It means a performance evaluation index of the model based on change of a reference value for a confidence value with respect to the result predicted by the model. Here, the confidence value represents a degree to which the model is confident about the detected result.

The step of centering the overlay key based on the best model may receive a live image of the overlay key and detect a center coordinate value from the live image of the overlay key through the best model, and centering the overlay key based on the center coordinate value.

As one example, the migrated best model is used in centering the overlay key. As an input, the live image of the overlay key required be centered is input and as an output, center coordinate X value and Y value of the overlay key are detected through the model. Using the center coordinate X value and Y value of the overlay key, the overlay key may be centered.

The step of generating the measurement image data may generate at least one measurement image data for training by processing the photographed measurement image data. As one example, the measurement image data for training may be generated by rotating the measurement image data at a predetermined angle. Alternatively, the measurement image data may be generated as images based on the position, angle, image brightness and wavelength of a target.

As one example, deep neural networks may be used for deep learning. The deep neural network may increase the accuracy of the model by increasing parameters after stacking many hidden layers. In order to properly train parameters up to millions of parameters, a huge amount of learning data is required. In particular, the leaning data must be diverse enough to sufficiently reflect reality and have excellent quality.

If sufficient learning data to train the parameters is not secured, a problem of overfitting that hinder the performance of the model0 are likely to occur. Overfitting is a phenomenon in which a model overfits only to the learning data and fails to respond well to test data or new data.

To solve the overfitting problem, it is more important than anything else to train a network with a variety of training data. As such, data augment is used as one of techniques for securing the necessary data to sufficiently train the deep neural network. Data augmentation refers to a methodology for securing a large amount of new training data by artificially changing a small amount of training data.

For example, new image data may be secured by flipping or cropping the image vertically and horizontally. In addition, training data may be augmented by changing the brightness of the image.

Figure 4:
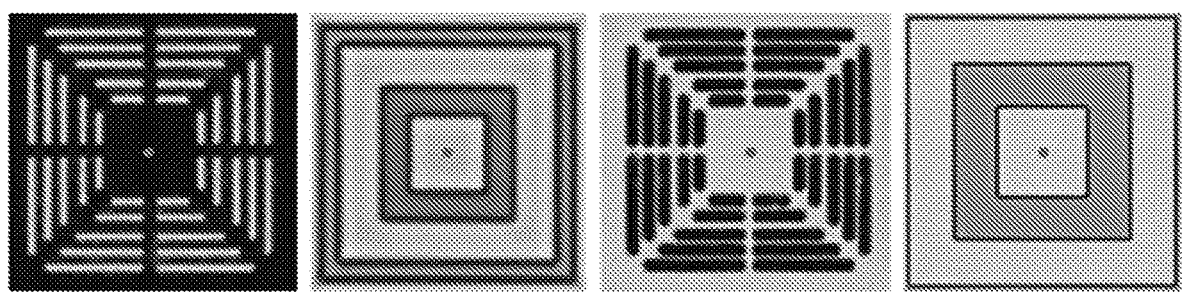
FIG. 4 shows an image resulting from detecting the center of an overlay key by using a model of FIG. 2.

FIG. 4 shows an image resulting from detecting the center of an overlay key by using a model of FIG. 2.

As the result image resulting from detecting the target center by using the deep learning model, a red dot is a target center value found by the learned model. The model requires a learning process, and performance may vary based on the quality of the image used during the learning.

Figure 5:
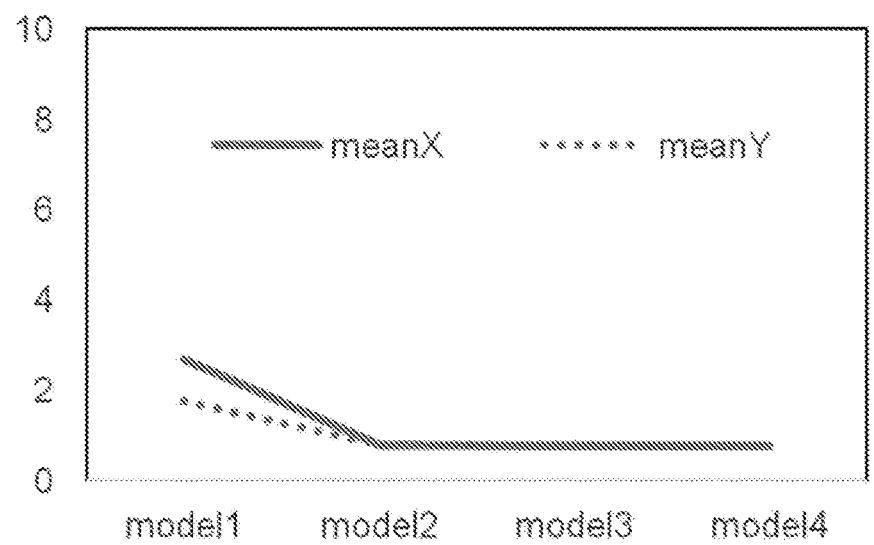
FIG. 5 is a graph showing that a stable model can be obtained through periodic learning.

FIG. 5 is a graph showing that a stable model can be obtained through periodic learning.

As shown in FIG. 5, model1, model2, model3 and model4 periodically perform learning. Modell is the earliest model and Model4 is the latest model. meanX and meanY represent an average value of a difference between a predicted center value and an actual center value found in the model.

When periodical learning is performed, the model learns a lot of data so that the model gradually becoming stable may be obtained.

Figure 6:
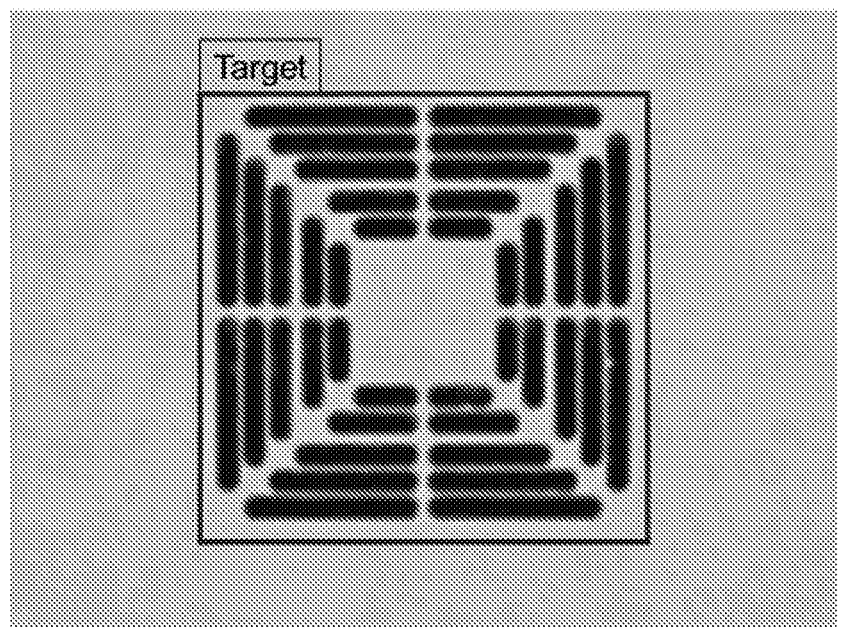
FIG. 6 is a view showing an image file among the input data sets of FIG. 2.

FIG. 6 is a view showing an image file among the input data sets of FIG. 2.

As one example, the configuration of the input data set may be an image file (File format: bmp) or a label file (File format: txt). The image may be an image centered with an overlay key measurement image.

The label may have total five indexes of location information of the overlay key.

As one example, index1 may be a kind of an overlay key to be learned, for example, 5X GlobalKey and SiteKey.

Index2 may be a value obtained by dividing an x-position pixel value of the overlay key to be learned by the overall image size.

Index3 may be a value obtained by dividing a y-position pixel value of the overlay key to be learned by the overall image size.

Index4 may be a value obtained by dividing a width value of a mounding box of the overlay key to be learned by the total image size.

Index5 may be a value obtained by dividing a height value of the bounding box of the overlay key to be learned by the total image size.

Index2 and Index3 may use values verified through 'TargetFinder' logic.

The output may detect information on the location and size of the overlay key in the live image based on Yolo model (one of the object detecting models) learning the input data sets.

As described above, the deep learning-based overlay key centering system may include at least one overlay measurement device configured to store and transmit an input data set to a server, the input data set including measurement image data of an overlay key and label data including information on the location and bounding box size of the overlay key; and a server configured to collect the input data set from the at least one measurement device and train by inputting the input data set to a model for deep learning.

The server may compare result data predicted by the model with the label data and calculate a loss function based on the result of comparison. The server may optimize the model algorithm by modifying the weights of the model to make a loss value calculated based on the loss function smaller than a reference, and train the model based on the optimized model algorithm.

The server may input the input data sets to the model a predetermined number of times and modify the weights of the model, which is repeated.

The server may further include a process of selecting the best model among the trained models.

The server may select a model having a loss value that is smaller than the reference value, and calculate a score based on at least one of Precision, Recall, mAP (Mean Average Precision) and metric of F1 among the selected models so that the model having a high score as the best model.

The deep learning-based overlay key centering system according to an embodiment may further include an overlay measurement device configured to receive the best model from the server and center the overlay key based on the best model.

The overlay measurement device may receive a live image of the overlay key and detect a center coordinate value from the live image of the overlay key based on the best model, only to center the overlay key by using the center coordinate value.

The overlay measurement device may register the image of the centered overlay key to the recipe.

A method of centering a deep learning-based overlay key according to an embodiment may include a step of collecting an input data set from at least one device; and a step of inputting the input data set to a model for deep learning to train the model.

The input data set may include measurement image data of an overlay key and label data including information on the location and bounding box size of the overlay key.

The step of training the model may include a step of comparing the result data predicted by the model with the label data and calculating a loss function based on the result of the comparison; and a step of modifying the weight of the model to make a loss value calculated based on the loss function smaller than a reference value and optimizing the algorithm of the model.

The step of training the model may repeat a process of modifying the weight of the model by inputting the input data set to the model a predetermined number of times.

The method of centering the deep learning-based overlay key may further include a step of selecting the best model among the trained models.

The step of selecting the best model may include a step of selecting a model having a smaller loss value than the reference value; and a step of selecting a model having a high score value that is calculated based on at least one of Precision, Recall, mAP and metric of F1 among the selected models.

One example of the step of selecting the best model by training the models is as follows.

First, the result data predicted by the models may be compared with the label data (i.e., an actual correct value) and a loss function may be computed based on the result of the comparison. The weights of the models may be modified so that the loss value computed based on the loss function may be smaller, in order to optimize the algorithm of the models.

Here, the label data may include at least one of a type of the overlay key to be trained, a value obtained by dividing a pixel value of an X-position of the overlay key to be trained by the size of the entire image, a value obtained by dividing a pixel value of a Y-position of the overlay key to be trained by the size of the entire image, and a value obtained by dividing the width of the bounding box of the overlay key to be trained by the entire image size.

Next, the step of training the model may repeat a process of modifying the weight of the models by inputting the input data sets to the models a predetermined number of times. For example, weights for Precision, Recall, mAP, and metric of F1 may be modified so that the loss value may become small.

Precision is an indicator of how precise the predicted result is and means the ratio of objects with correct answers among all detected objects. For example, Precision may be calculated with a formula of True Positive/(True Positive+False Positive)=True Positive/all detections. Here, 'True Positive' indicates that the result of the comparison between the predicted result data and the label data is 'True' and the actual correct answer value is 'True'. 'False Positive' indicates that the result of the comparison between the predicted result data and the label data is 'False' and the actual correct value is 'False'.

Recall means the ratio of True Positive and (True Positive+False Negative). Recall may be calculated with a formula of True Positive/(True Positive+False Negative)=True Positive/(all ground truths). Here, 'False Negative' indicates that the result of the comparison between the predicted result data and the label data is 'False' and the actual correct answer value is 'True'.

F1 means the harmonic mean of Precision and Recall. For example, F1 may be calculated with a formula of F1=2×(Precision×Recall)/(Precision+Recall).

mAP (Mean Average Precision) represents a performance evaluation index of the model by a change in a threshold value for a confidence value for the result predicted by the model. Here, the confidence value means the degree to which the model is confident about the detected result.

Next, scores for Precision, Recall, mAP and the metric of F1 may be calculated based on the above formulas. A model having high scores may be selected as the best model.

The method of centering the deep learning-based overlay key may further include a step of centering the overlay key by using the best model.

The step of centering the overlay key by using the best model may include a step of receiving a live image of the overlay key; a step of detecting a center coordinate value from the live image of the overlay key; and a step of centering the overlay key based on the center coordinate value.

As one example, a method of centering an overlay key in an optical overlay measurement device may obtain an image of a predetermined size in an area where an overlay mark exists, when an overlay mark is recognized through a lens, and then determine the obtained image as a first image. The method may generate a second image by converting the first image.

The overlay measurement device may compare characteristic values of the first image and the second image to calculate a comparison value. The overlay measurement device may check whether the comparison value is within a preset reference range to determine similarity between the first image and the second image. When the comparison value is within the preset reference range, the overlay measurement device may determine that the first image and the second image are identical and determine the center point of the first image. Also, it may determine the center point of the overlay mark as the center point of the first image.

The overlay measurement device may register the centered overlay key image to the recipe when converting the recipe. When a normal operation is implemented, the overlay measurement device may detect a position, at which the image of the model registered in the recipe matches the live image on FOV, as the center point and additionally move the state as much as the offset.

The method of centering the deep learning-based overlay key according to an embodiment may further include a step of generating measurement image data in at least one device.

The step of generating the measurement image data may generate at least one measurement image data for training by changing at least one of the position, angle, image brightness and wavelength of the measurement image data.

The deep learning-based overlay key centering system according to an embodiment may include at least one overlay measurement device configured to generate an input data set including measurement image data of the overlay key and label data and transmit the input data sets to a server. The label data may include information on the location and bounding box size of the overlay key.

The label data may include at least one of a type of the overlay key to be trained, a value obtained by dividing a pixel value of an X-position of the overlay key to be trained by the size of the entire image, a value obtained by dividing a pixel value of a Y-position of the overlay key to be trained by the size of the entire image, and a value obtained by dividing the width of the bounding box of the overlay key to be trained by the entire image size.

The method of centering the deep learning-based overlay key may precisely center the overlay key based on deep learning, thereby precisely measuring and examining the alignment state of the fine patterns of the semiconductor substrate.

In addition, the method of centering the deep learning-based overlay key may prevent PR (Pattern Recognition) failure that might occur when variation for each overlay key is severe.

In addition, the method of centering the deep learning-based overlay key may compensate for PR misleading that might occur on a layer sensitively reacting to a PR parameter.

Although the present invention has been described with reference to the exemplified drawings, it is to be understood that the present invention is not limited to the embodiments and drawings disclosed in this specification, and those skilled in the art will appreciate that various modifications are possible without departing from the scope and spirit of the present invention. Further, although the operating effects according to the configuration of the present invention are not explicitly described while describing an embodiment of the present invention, it should be appreciated that predictable effects are also to be recognized by the configuration.

The invention claimed is:

1. A deep learning-based overlay centering system comprising:
    a server configured to collect an input data set, which comprises measurement image data of an overlay key with label data including information on a location and bounding box size of the overlay key, from at least one overlay measurement device and train a model by inputting the input data set to a model for deep learning, wherein the server calculates a loss function by comparing result data predicted by the model with the label data, and optimizes an algorithm of the model by modifying a weight of the model so that a loss value calculated with the loss function may become smaller than a reference value, to train the model, and wherein the label data comprises at least one of a type of the overlay key to be trained, a value obtained by dividing a x-coordinate value among center coordinates (x, y) of the overlay key to width value of measured image of the overlay key, a value obtained by dividing a y-coordinate value among center coordinates (x, y) of the overlay key to height value of measured image of the overlay key, a value obtained by dividing width of the bounding box of the overlay key to width value of measured image of the overlay key, and a value obtained by dividing height of the bounding box of the overlay key to height value of measured image of the overlay key.

2. The deep learning-based overlay centering system of claim 1, wherein the server repeats a process of modifying the weight of the model by inputting the input data set to the model a predetermined number of times.

3. The deep learning-based overlay centering system of claim 1, wherein the server performs a process of selecting a best model among the trained models.

4. The deep learning-based overlay centering system of claim 3, wherein the server selects a model having a smaller loss value than the reference value, calculates scores for the selected models by using at least one of Precision, Recall, mAP (Mean Average Precision) and metric of F1, and selects a model having a high score as the best model among the selected models.

5. The deep learning-based overlay centering system of claim 3, wherein the overlay measurement device centers an overlay key based on the best model by receiving the best model from the server.

6. The deep learning-based overlay centering system of claim 5, wherein the overlay measurement device receives a live image of an overlay key, detects a center coordinate value from the live image of the overlay key through the best model, and center an overlay key based on the center coordinate value.

7. The deep learning-based overlay centering system of claim 5, wherein the overlay measurement device registers an image of the centered overlay key in a recipe.

8. A method of centering a deep learning-based overlay comprising:

a step of collecting an input data set from at least one device, the input data set comprising measurement image data of an overlay key and label data including information on a position and bounding box size of the overlay; and a step of training the model by inputting the input data set to a model for deep learning, wherein the label data comprises at least one of a type of the overlay key to be trained, a value obtained by dividing a x-coordinate value among center coordinates (x, y) of the overlay key to width value of measured image of the overlay key, a value obtained by dividing a y-coordinate value among center coordinates (x, y) of the overlay key to height value of measured image of the overlay key, a value obtained by dividing width of the bounding box of the overlay key to width value of measured image of the overlay key, and a value obtained by dividing height of the bounding box of the overlay key to height value of measured image of the overlay key, and wherein the step of training the model comprises, a step of calculating a loss function by comparing result data predicted by the model with label data; and a step of optimizing an algorithm of the model by modifying a weight of the model so that a loss value calculated with the loss function may become smaller than a reference value.

9. The method of centering the deep learning-based overlay of claim 8, wherein the step of training the model repeats a process of modifying the weight of the model by inputting the input data set to the model a predetermined number of times.

10. The method of centering the deep learning-based overlay of claim 8, further comprising:

a step of selecting a best model among the trained models.

11. The method of centering the deep learning-based overlay of claim 10, wherein the step of selecting the best model comprises, a step of selecting a model having a small loss value than the reference value; and a step of calculating a score by using at least one of Precision, Recall, mAP and metric of F1 among the selected models and selecting a model having a high score as the best model.

12. The method of centering the deep learning-based overlay of claim 10, further comprising:

a step of centering an overlay key by using the best model.

13. The method of centering the deep learning-based overlay of claim 12, wherein the step of centering the overlay key by using the best model comprises, a step of receiving a live image of the overlay key;

a step of detecting a center coordinate value from the live image of the overlay key through the best model; and a step of centering the overlay key based on the center coordinate value.

14. The method of centering the deep learning-based overlay of claim 8, further comprising:

a step of generating the measurement image data in the at least one device.

15. The method of centering the deep learning-based overlay of claim 14, wherein the step of generating the measurement image data generates at least one measurement image data for training by changing at least one of the location, angle, image brightness and wavelength of the measurement image data.

16. A deep learning-based overlay centering system comprising:

at least one overlay measurement device configured to generate an input data set, which comprises measurement image data of an overlay key and label data, and transmit the input data set to a server, wherein the label data comprises information on a location and bounding box size of the overlay key, and wherein the label data comprises at least one of a type of the overlay key to be trained, a value obtained by dividing a x-coordinate value among center coordinates (x, y) of the overlay key to width value of measured image of the overlay key, a value obtained by dividing a y-coordinate value among center coordinates (x, y) of the overlay key to height value of measured image of the overlay key, a value obtained by dividing width of the bounding box of the overlay key to width value of measured image of the overlay key, and a value obtained by dividing height of the bounding box of the overlay key to height value of measured image of the overlay key.

17. The deep learning-based overlay centering system of claim 16, wherein server generates measurement image data for training by rotating the measurement image data based on a certain angle.

* * * * *